Figure 1:
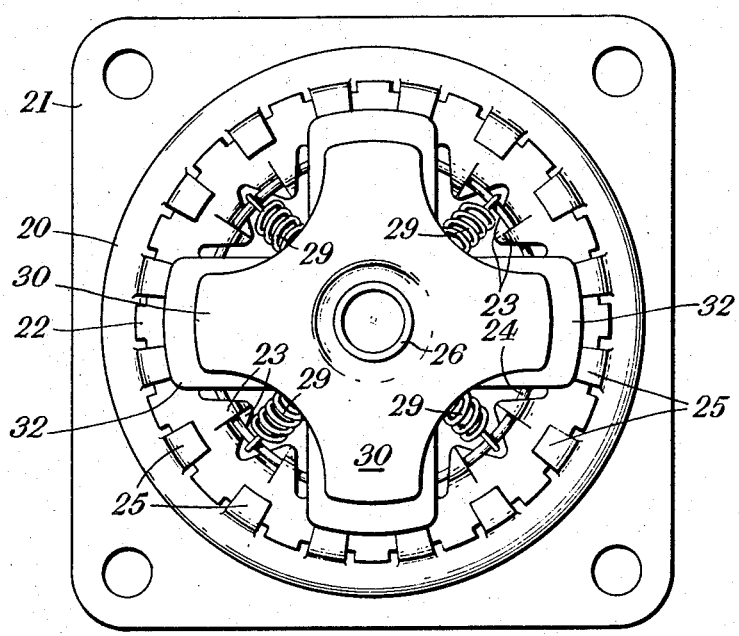

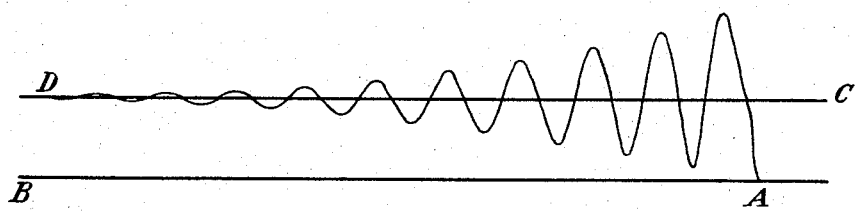
*Fig. 14.*
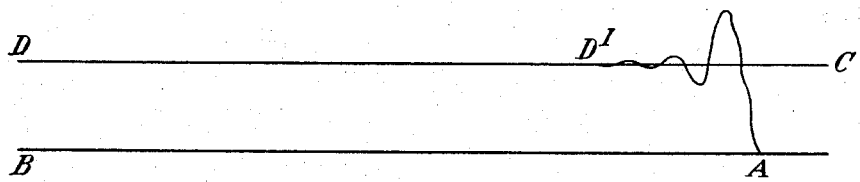
*Fig. 15.*
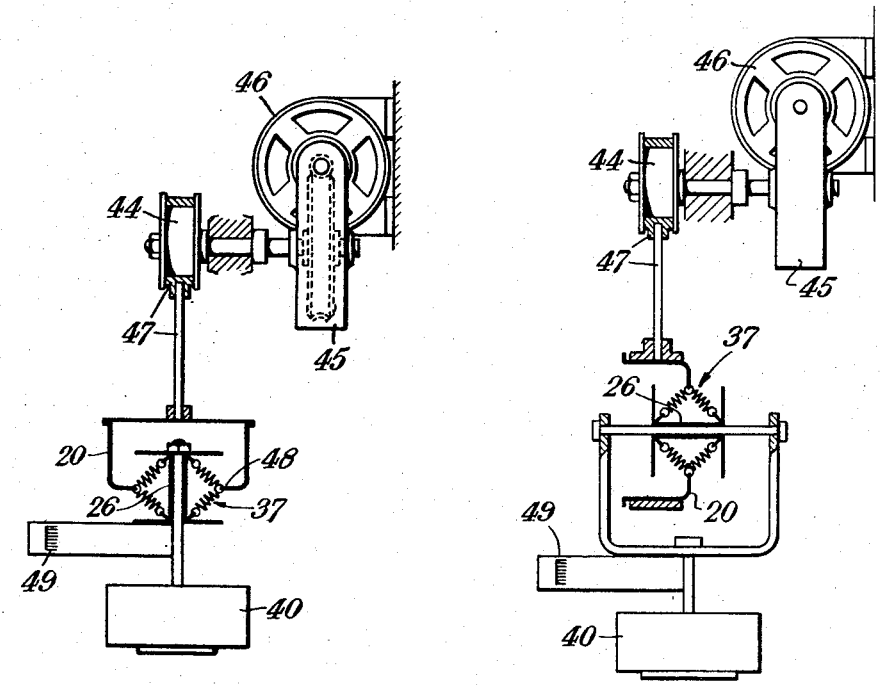
*Fig. 16.*          *Fig. 17.*

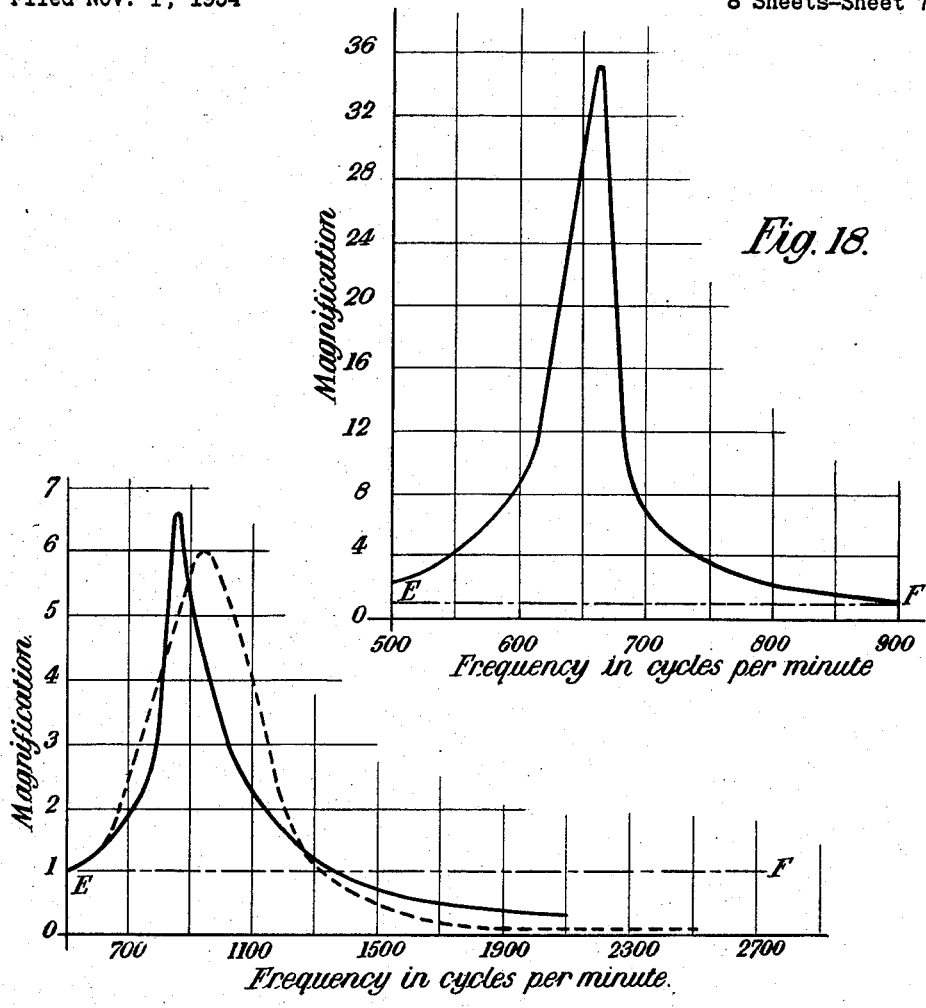
Fig. 18.
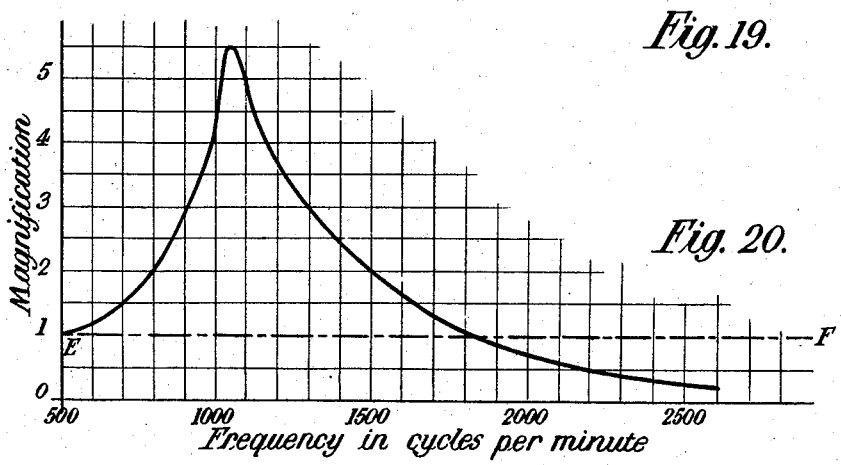
Fig. 19.
Fig. 20.

2,924,419

ANTI-VIBRATION MOUNTING DEVICE

Alfred William John Wells, Llangoed, Anglesey, North Wales, assignor of one-half to United-Carr Fastener Corporation, Boston, Mass., a corporation of Delaware, and one-half to A. Wells & Company Limited, London, England, a British company Application November 1, 1954, Serial No. 466,135

Claims priority, application Great Britain November 6, 1953

14 Claims. (Cl. 248—358)

This invention relates to anti-vibration mounting devices and more particularly to such devices of the type described in United States Patent No. 2,600,090.

An anti-vibration mounting is described in United States Patent No. 2,600,090 comprising an annular base member, a columnar member passing centrally through the opening in the base member, and two sets of helical springs, one set on each side of the base member, the springs extending between and being secured at their opposite ends to the base member and to the columnar member respectively, being arranged with their axes on the surfaces of two opposed cones, the generating lines of which are inclined to the base member at angles such that the springs offer substantially equal resistance to movement between the base member and the columnar member in all planes, and being initially tensioned and held under equal tension when the mounting is not loaded.

It is desirable to provide means for damping resonant vibrations in such mountings. It is proposed to achieve this in United States Patent No. 2,600,090 by providing two opposed cups mounted to slide on the columnar member, and a spring mounted in compression between the cups and urging them apart and into contact with the inner surfaces of the springs. It has also been proposed to fit vibration dampers to the individual springs of the mounting. Thus British specification No. 571,026 discloses fitting a spring of hairpin shape within each helical spring, and it is proposed in our copending application Serial No. 407,531, filed February 1, 1954, which issued as U.S. Patent No. 2,838,267 on June 6, 1958, to provide damping sleeves frictionally engaging the exterior or interior surfaces of some at least of the helical springs.

Mountings of the above kind are tested, as described in more detail below, by applying a periodic axial input displacement, say of 10 thousandths of an inch, to the base member of the mounting, which is loaded at its rated load, and measuring the effect of variation of the input frequency on the output, i.e. the resulting displacement of the columnar member. At a certain resonant frequency there is a marked peak in the curve plotted between output displacement and frequency, the peak output displacement often being as much as 30 and more times the input displacement. Hitherto we have not found it possible, by fitting individual dampers to the helical springs of the mounting to reduce the peak output displacement sufficiently. Such resonant vibration of the mounting is, of course, liable to cause damage to sensitive instruments supported by it.

We believe that this is due to the fact that the inclination to the base plate of the springs of the upper and lower cones changes comparatively little even when the displacement of the columnar member in relation to the base member is large, with the result that the above described central damper, or individual dampers on the helical springs, are not very effective under resonant conditions.

The present invention provides an anti-vibration mounting comprising a base member constituted by an upstanding pot having an opening in its upper end, a columnar member passing centrally through the opening in the base member, two sets of helical springs, one set on each side of the base member, said springs extending between and being secured at their opposite ends to the base member, adjacent the periphery of said opening, and to the columnar member respectively, being arranged with their axes on the surface of two opposed cones and being initially tensioned and held under equal tension when the mounting is not loaded, and a resilient vibration damper disposed between the columnar member and the pot.

Preferably the vibration damper comprises a plurality of compression springs extending in a direction substantially transverse to the axis of the columnar member. The outer ends of these springs may be attached to or bear against the inner wall of the pot. Preferably, however, each damping spring encircles a button which is urged by the spring towards the inner wall of the pot. The damping springs may conveniently extend between the pot and a stop plate on the columnar member which serves to limit the axial movement of the columnar member.

As a further alternative the vibration damper may comprise an annular washer of wire mesh disposed between the columnar member and the pot.

As hereinafter explained, it may in some cases be desirable to introduce lost motion into the vibration member so that it will provide non-linear damping, becoming fully effective only when the deflection of the mounting has reached a predetermined value.

The above-described forms of vibration damper extending transversely between the columnar member and the pot are mainly intended to damp axial movement of the mounting at the resonant frequency. We have found that not only do they do this very effectively but that they are also effective in damping radial movement of the mounting at the resonant frequency. As an alternative to the transversely extending vibration damper, we may, however, use a vibration damper constituted by a plurality of damping springs extending axially of the mounting, or nearly so, between the columnar member and a member attached to the bottom of the pot.

As explained in United States Patent No. 2,600,090, by appropriate choice in the inclination to the base member of the generating lines of the cones, the mounting will offer substantially equal resistance to movement between the base plate and the columnar member in all planes, and we prefer that the mounting should, so far as possible, comply with this condition. It should, however, be pointed out that the introduction of the damping springs results in some departure from true equiflexibility of the mounting generally depending on the amount of damping required.

In one commercially available form of the mounting described in United States Patent No. 2,600,090, the base member is constituted by an open-bottomed pot-shaped pedestal of circular section having the two sets of helical springs fitted to the margin of a circular hole at its upper end, and transversely extending damping springs can readily be fitted between the central columnar member and the pot of this form of mounting.

In another commercially available form of the mounting described in United States Patent No. 2,600,090 the base member is constituted by a square base plate having a circular hole to accommodate the columnar member. In this case it will be necessary to fit to the base plate a pot which is the counter-part of the pedestal pot referred to above, the transversely extending damping springs being disposed between the columnar member and the pot so provided.

We have found that the output displacement at resonance of the mounting can be reduced to 3.5 times the input displacement or less by providing damping springs extending transversely between the columnar member and the pot. The damping effect can be varied by altering the strength or varying the number of the damping springs. When such damping springs are provided, we find the lighter load springs will be required in the mounting to achieve a given load rating. The damping springs may, if desired, be fitted with individual damping sleeves as described in application Serial No. 407,531, filed February 1, 1954. Also, the mounting may be provided with additional damping, e.g. by a central cup-type damper of the kind described in United States Patent No. 2,600,090 or by fitting the load springs with individual damping sleeves as described in application No. 407,531, filed February 1, 1954.

Figure 2:
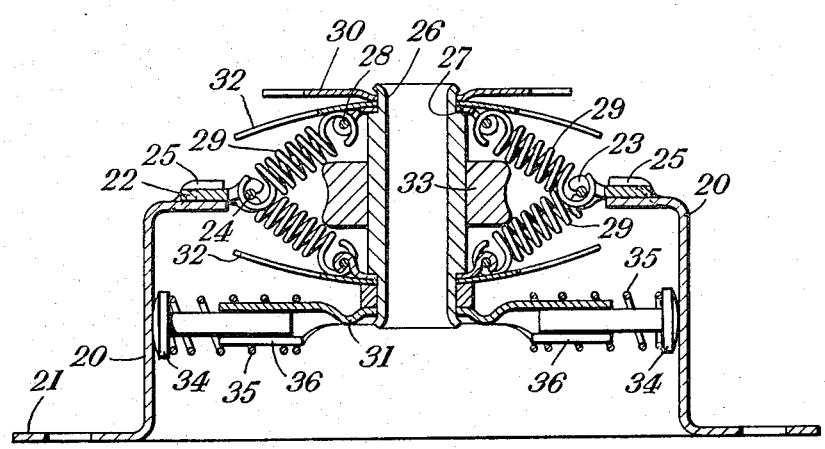
Figure 3:
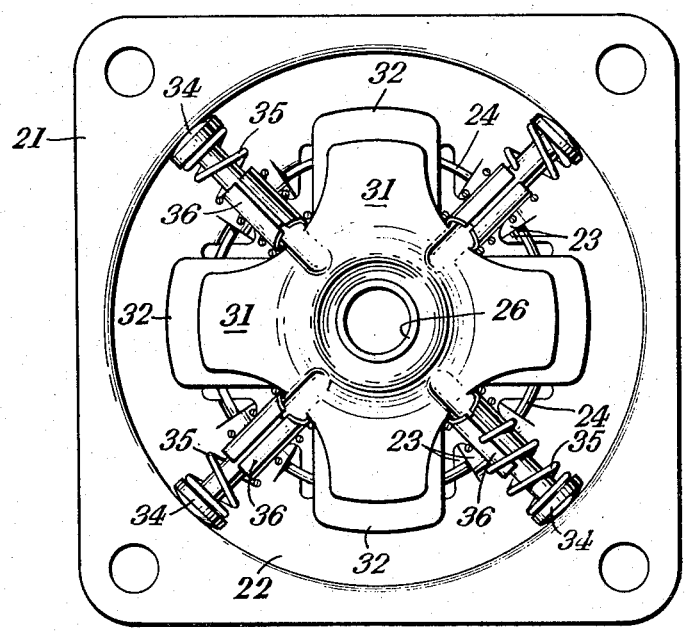
Figure 4:
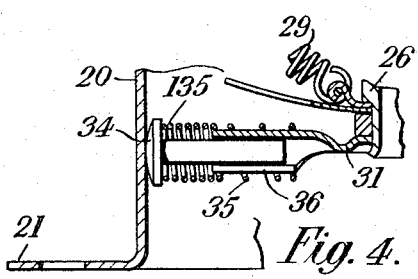
Figure 5:
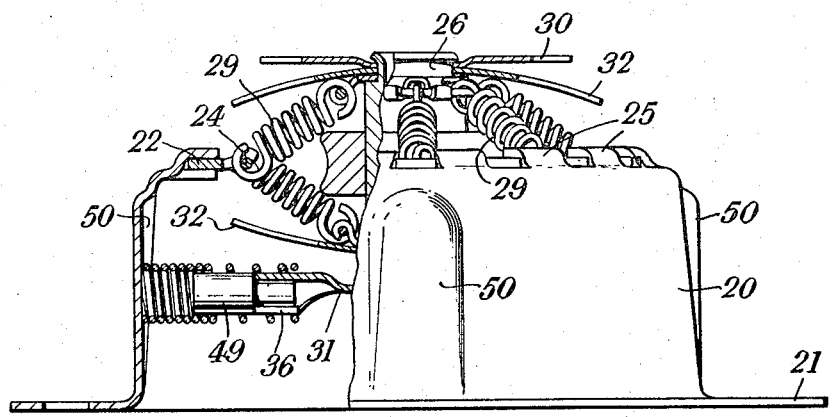
Figure 6:
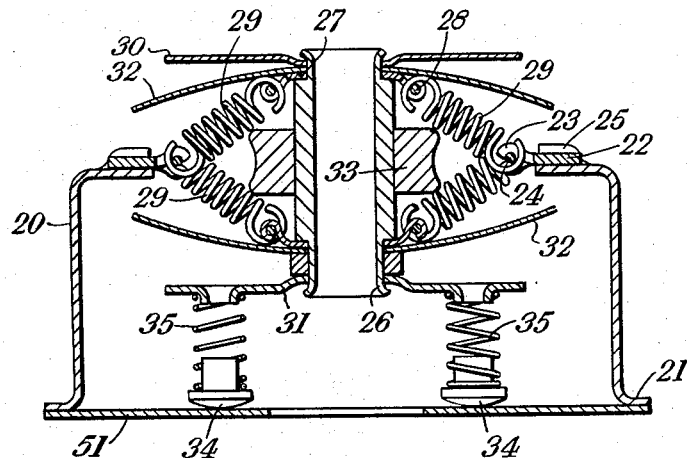
Figure 7:
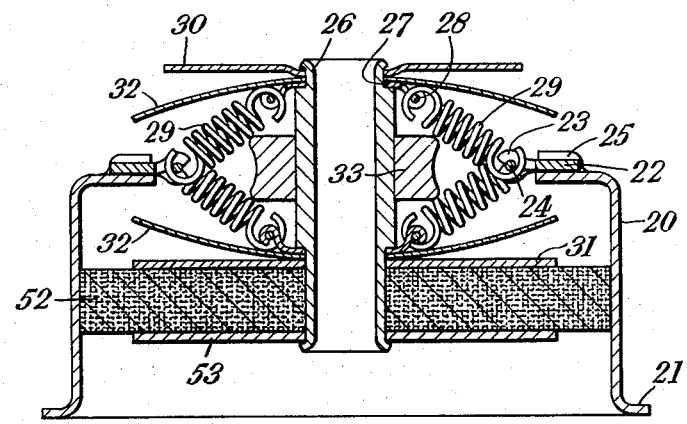
Figure 13:
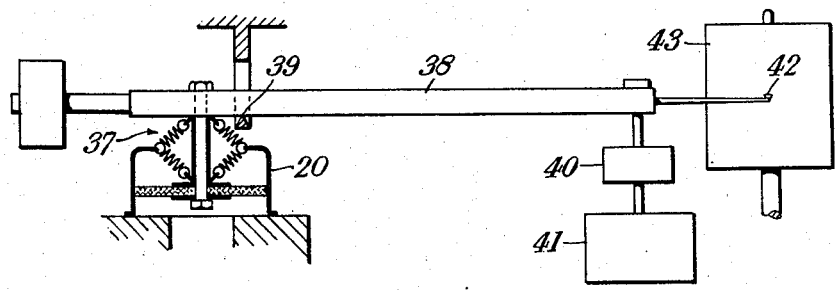
Figure 8:
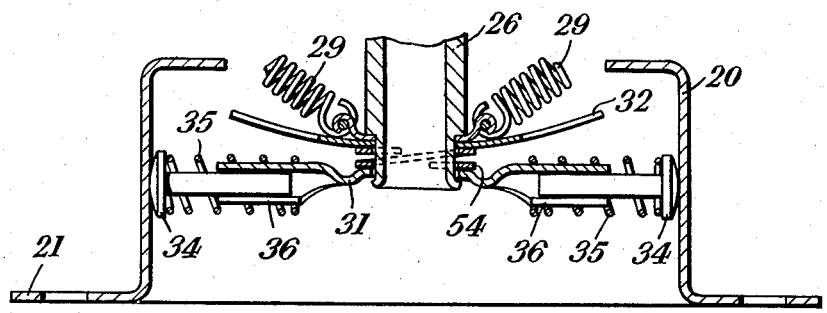
Figure 9:
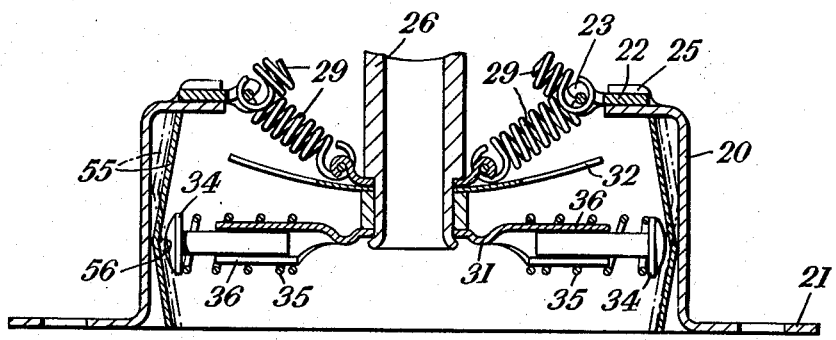
Figure 10:
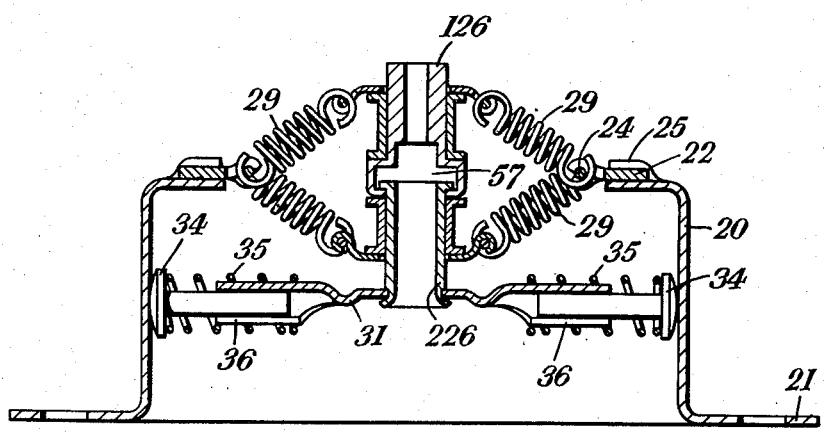
Figure 11:
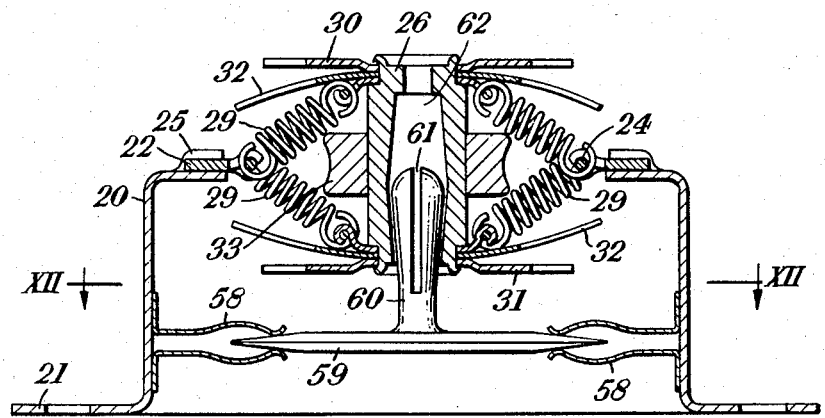
Figure 12:
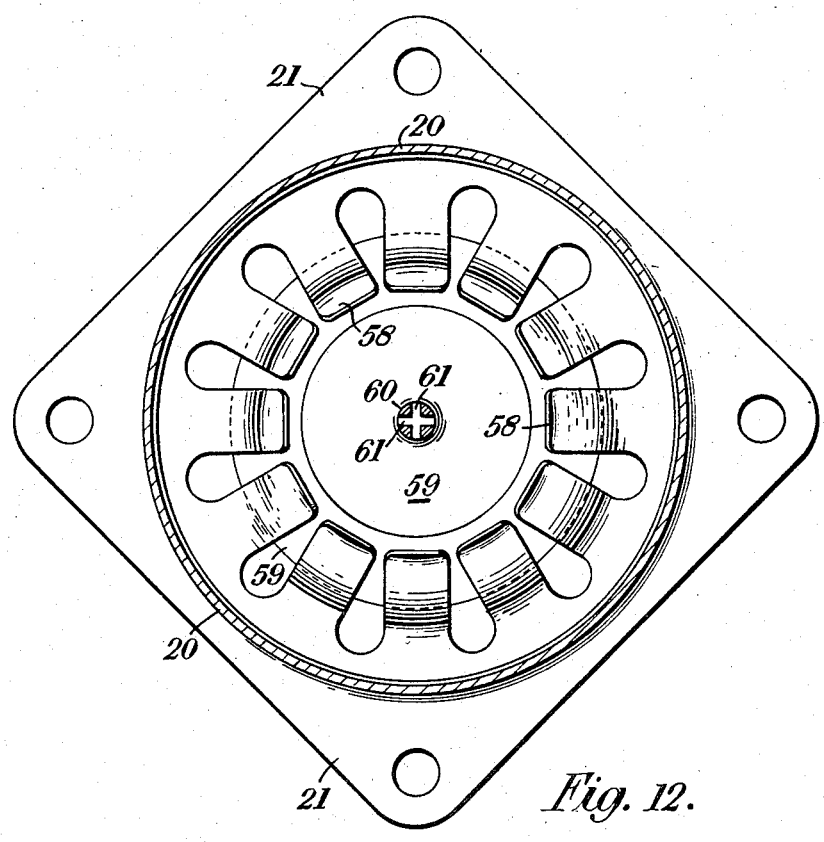

Certain embodiments of the invention will now be described in more detail, by way of example, with reference to the accompanying drawings, in which:

Fig. 1 is a top plan view of one form of anti-vibration mounting according to the invention, Fig. 2 is a vertical section through the mounting shown in Fig. 1, Fig. 3 is a corresponding plan view, Fig. 4 is a detail view showing an alternative form of damping spring, Fig. 5 is a side elevation, partly in section, of an alternative form of mounting, Fig. 6 is a vertical section through another form of mounting, showing a different arrangement of damping springs, Fig. 7 is a vertical section through still another form of mounting having a diaphragm type vibration damper, Fig. 8 is a vertical section through a mounting similar to that of Figs. 1–3 but with provision for non-linear damping, Figs. 9–11 are respectively vertical sections through other forms of mounting, similar in principle to that of Figs. 1–3, but showing alternative methods of achieving non-linear damping, Fig. 12 is a section on the line XII—XII in Fig. 11, Fig. 13 shows diagrammatically one form of device for testing the mountings according to the invention, Figs. 14 and 15 show respectively records obtained by the device of Fig. 13 with mountings as described in United States Patent No. 2,600,090 and according to the invention, Fig. 16 shows diagrammatically a known form of apparatus for applying a periodic input displacement to the mounting and measuring the resulting output displacement, Fig. 17 shows the apparatus of Fig. 16 modified to apply the input displacement to the mounting in the radial direction and Figs. 18–23 are graphs showing the results of tests with the apparatus of Figs. 16 and 17 on various anti-vibration mountings.

Like reference characters indicate like parts throughout the drawings.

The anti-vibration mounting shown in Figs. 1–3 is of the general construction described in United States Patent No. 2,600,090. The base member of the mounting is consittuted by a pot 20 having an outwardly flanged base 21 for securing it to a support. The pot has a central opening at its upper end and carries on its upper surface an annular plate 22 having on it alternate upwardly and downwardly projecting fingers 23 which support a wire ring 24, the plate 22 being held in position by inwardly turned projections 25 on the pot.

The columnar supported member of the mounting is constituted by a tube 26, carrying at its upper end an annular plate 27 supporting a wire ring 28. The tube 26, to which the member to be supported by the mounting may be attached by a bolt passing through the tube, is supported in relation to the pot by two sets of helical wire springs 29, the ends of which are lopped over the wire rings 24, 28. The springs 29 are initially tensioned and are held under equal tension when the mounting is not loaded. They are arranged on the surfaces of two opposed cones, the generating lines of which are preferably inclined to the upper surface of the pot at an angle, usually 30–40°, such that the mounting offers substantially equal resistance to movement between the pot 20 and the tube 26 in all planes.

The tube 26 carries at its ends stop plates 30, 31 each having four outstanding fingers, which serve to limit the axial movement of the tube in relation to the pot. Beneath the upper stop plate 30 and above the lower stop plate 31 are spring leaves 32 which serve to protect the mounting against sudden accelerations. These spring leaves will, by contact with the top of the pot, absorb accelerations before the mounting bottoms, i.e. before the stop plates are arrested by contact with the pot. The extent to which the spring leaves may absorb accelerations depends upon their design, and accelerations of up to about 15g or more may be absorbed by suitable design of the spring leaves. Surounding the tube 26 is a collar 33 which serves to prevent excessive radial movement of the tube.

The mounting includes a vibration damper, constituted by four radially extending buttons 34 which are held by compression springs 35 in contact with the inner surface of the pot. As shown, the shanks of the buttons 34 are accommodated in sleeves 36 on the bottom stop plate 31. The buttons may be of a suitable synthetic resin, e.g. Tufnol, in which case it is important to provide lubricant, e.g. lubricating oil or preferably colloidal graphite, between their surfaces and the interior of the pot. Alternatively the buttons may be made of oil impregnated phosphor bronze or of oil impregnated sintered metal powder, e.g. iron, bronze or brass powder.

These transversely extending spring loaded buttons 34 coact with the pot to constitute a highly efficient vibration damper, as will be seen from the following experimental results:

Reference will first be made to the test illustrated by Figs. 13–15. In this case the mounting 37 is loaded by a counter-weighted beam 38 pivoted at 39 and carrying two weights 40, 41. The weight 40 is a weight corresponding to the rated load of the mounting. In the specific case shown in Figs. 14 and 15 this is 8 lbs., and this weight deflects the mounting axially by $\frac{1}{16}''$. The addition of the other weight 41 serves to deflect the mounting to $\frac{3}{16}''$. The beam 38 carries a stylus 42 which coacts with a chart on a drum 43 which is rotated at 15 r.p.m. about a vertical axis by a motor, not shown. The test is carried out by suddenly removing the lower weight 41. Fig. 14 shows the trace on the chart obtained with a standard 8 lb. mounting constructed in accordance with specification No. 571,026 and having no vibration damping spring loaded buttons. When the weight 41 is removed, the stylus leaves the point A on the line AB, representing a deflection of $\frac{3}{16}''$, and it takes a substantial time before it settles down at the point D on the line CD representing a deflection of $\frac{1}{16}''$. Fig. 15 shows the trace obtained on the chart when the test is applied to a mounting as shown in Figs. 1–3 fitted with a vibration damper. As will be seen, the stylus comes to rest far more quickly on the line CD at the point marked $D^1$.

The second test consists in applying to the mounting a periodic input displacement and measuring the effect of variation of the input frequency on the output displacement. The apparatus used is shown diagrammatically in Figs. 16 and 17. In the case of Fig. 16, the apparatus is set up to apply a periodic input displacement in the axial direction. It comprises an eccentric 44, the throw of which is adjustable, which is rotated through a gear box 45 by a variable speed electric motor 46. The eccentric 44 supports a strap 47 fixed to the base plate 48 of the mounting 37. The tubular supported member of the mounting carries a weight 40 of value equal to its rated load and also a scale 49 which is examined through a microscope having a suitable index mark in its eyepiece, so enabling the output displacement, i.e. the displacement of the supported member, to be determined. Fig. 17 shows how the strap 47, the weight 40 and the scale 49 are connected to the mounting when it is desired to apply the periodic input displacement in the radial direction.

The results of tests on this apparatus are shown in Figs. 18-23, in all of which frequency in cycles per minute is plotted as abscissae and magnification, i.e. the ratio $$\frac{\text{output displacement}}{\text{input displacement}}$$

as ordinates.

Fig. 18 shows the result of an axial test on a standard 12 lb. mounting as described in specification No. 571,026 and having no vibration damper. The applied input amplitude, represented by EF, was .010" total, i.e. .005" to each side of the normal central position of the base plate. As will be seen, at the resonant frequency of about 660 c.p.m. the magnification is just over 35. Indeed with undamped mountings the vibration under this test at the resonant frequency at certain input displacements is sometimes so violent that the mounting bottoms and would accordingly impart a shock load to the member supported on it.

Fig. 19 shows the result obtained when the same axial test was applied to a similar 12 lb. mounting fitted with the vibration damper shown in Figs. 1-3. The input amplitude was again .010" total. The curve in full lines shows the result with lubricating oil on the Tufnol buttons, and the dash line curve the result when colloidal graphite was used as the lubricant. It will be noted that the magnification is greatly reduced to about 6.3 and 6 in the two cases shown, but that the resonance frequency is somewhat increased, i.e. to 860 c.p.m. and to 1050 c.p.m. Our experiments have shown that the magnification obtained with mountings of the kind shown in Figs. 1-3 can be varied by altering the strength of the vibration damping springs 35 and that the resonant frequency can be lowered, if desired, by increasing the load on the mounting beyond the rated value.

Fig. 20 shows the result obtained when the mounting used in the test shown in Fig. 19 was subjected to a radial input displacement. The input amplitude was again .010" total and as will be seen the magnification was only 5.5 at a resonant frequency of 1050 c.p.m.

Figure 21:
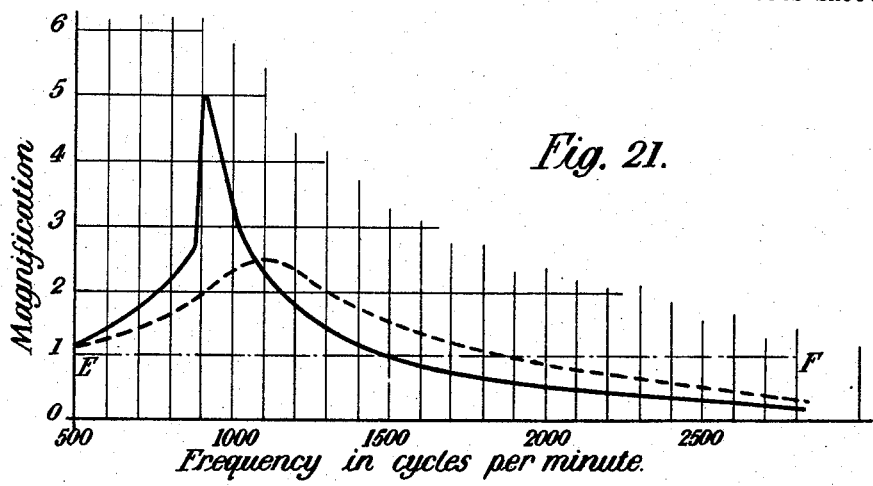
Figure 22:
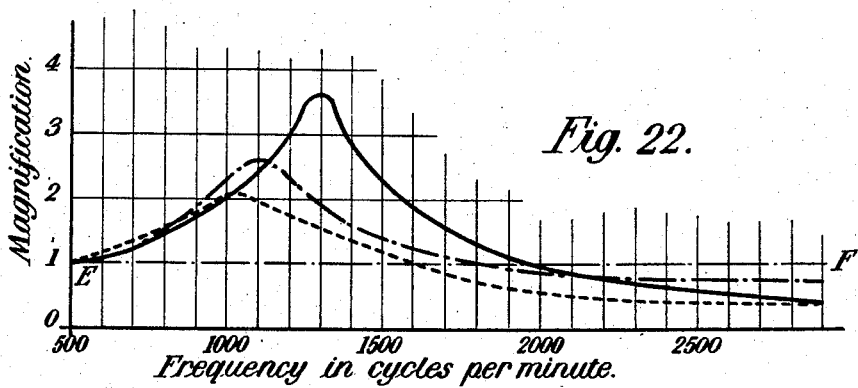

Fig. 21 shows the results of an axial test, at an input amplitude of .020" total, on a damped 2 lb. mounting; the full line showing the result with lubricating oil between the buttons and the pot and the dash line the result with colloidal graphite as lubricant. Fig. 22 shows an axial test on a damped 2 lb. mounting using colloidal graphite as the lubricant, the full line being obtained with an input amplitude of .010" total, the chain dotted line with an input amplitude of .020" total and the dash line with an input amplitude of .030" total.

It will be observed that, as shown at the right hand side of Figs. 19-21, in all cases the output amplitude at high frequencies is low, thus indicating that the mounting gives good insulation at high frequencies. The magnification at the resonant frequency is in all cases reduced to so low a value that there is no danger of the mounting ever bottoming to impart a shock load to the supported member, even if installed under conditions such that it is exposed to vibration at the resonant frequency.

The mounting of Figs. 1-3 produces linear damping in the axial direction. The damping in the radial direction is, however, non-linear.

It has been found that under some conditions, particularly at low input amplitudes, the mounting shown in Figs. 1-3 produces some noise and exhibits some lost motion in its damping action. This is due to a slight degree of play between the shanks of the buttons 34 and the sleeves 36. As hereinafter noted it is sometimes desirable that the damping should be effective only after the mounting has been displaced from its normal rest position. It is preferred, however, to achieve this result otherwise than by providing play between the shanks 34 of the buttons and the sleeves 36 and lost motion caused by such play can be reduced by providing closely adjacent coils on the portions 135 of the springs 35 adjoining the heads of the buttons 34, as shown in Fig. 4.

Fig. 5 shows a modification in which the four damping springs 35 are coiled around pins 49 projecting from the stop plate 31 and bear directly against the inner surface of the pot 20, no buttons being provided. In this case the sides of the pot do not extend vertically, with the result that the damping would be non-linear, the compression of the springs 35 increasing on upward movement of the tube 26 and decreasing on downward movement of said tube. In order to provide linear damping in the axial direction the outer ends of the springs 35 abut against the vertical inner surfaces of recesses 50 pressed into the inner wall of the pot. The recesses 50 cooperate with the springs 35 to restrain any tendency for the mounting to rotate about the axis of the tube 26, a tendency to be anticipated during banking of an aircraft in which the mountings are installed. The non-linear damping in the radial direction is more marked with this construction than with that of Figs. 1-3.

The mounting shown in Fig. 6 differs from those so far described in that the damping springs 35 and buttons 34 extend in the axial direction between the lower stop plate 31 and a plate 51 fixed to the bottom of the pot 20. Two damping springs only are shown in Fig. 6, but four such springs in all are provided, these being equally spaced around the periphery of the stop plate 31.

The damping springs shown in Figs. 1-3 which extend transversely between the lower stop plate and the pot constitute, in effect, a spring diaphragm. As an alternative and as shown in Fig. 7, we may use for damping purposes an annular washer 52 formed of wire mesh, say ¼" thick, and sandwiched between the stop plate 31 and an end washer 53, the outer surface of the washer 52 engaging frictionally the internal surface of the pot. The wire mesh washer 52 will likewise act as a diaphragm and serve to damp resonant vibration of the mounting in the axial direction and also to some extent in the radial direction. It is desirable, as in the cases in which spring loaded buttons are used as vibration dampers, to provide a lubricant between the outer surface of the wire mesh washer 52 and the inner surface of the pot 20.

Figs. 8-12 show various alternative forms of mounting in which lost motion is provided so that the damping is effective only after the mounting has experienced the predetermined axial displacement from its normal rest position. In each there are again four spring-loaded vibration damping buttons 34.

Figure 23:
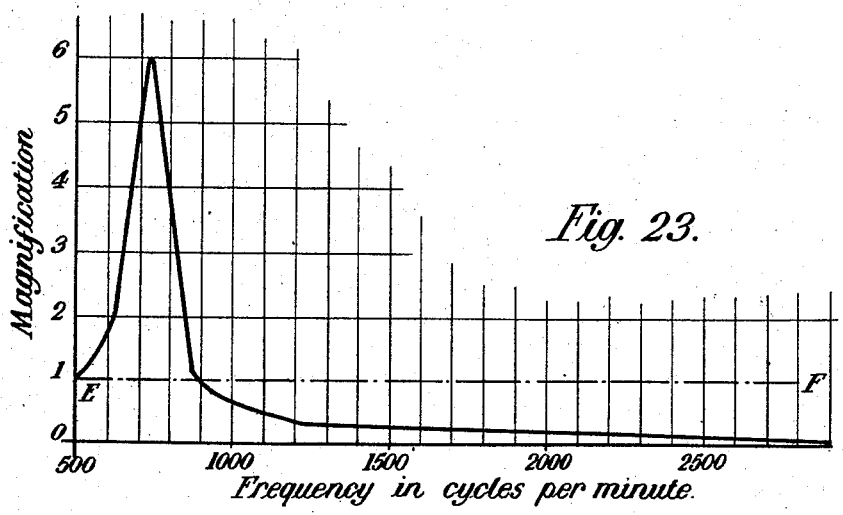

The mounting of Fig. 8 is very similar to that of Figs. 1-3 but the stop plate 31 carrying the buttons 34 is a loose fit on the tube 26, a spring washer 54 being interposed between the tube and the stop plate. The vibration damper will consequently be ineffective until the axial displacement of the mounting is sufficient to compress the spring washer 54. Fig. 23 shows the theoretical resonance frequency curve for such a mounting. It will be noted that at high frequencies the mounting is performing virtually undamped and gives isolation of vibration similar to that obtained with an undamped mounting.

In the mounting of Fig. 9, a sheet metal insert 55 is disposed inside the pot 20. The insert 55 consists of two oppositely tapering frustro-conical sections meeting at a section 56 of maximum diameter which is opposite the buttons 34 when the mounting is supporting its rated load, and the load acts downwardly on the tube 26. As will be seen the buttons 34 are then out of contact with the insert 55. At a resonant frequency similar to that of the undamped mounting of Fig. 18 the mounting will begin to vibrate, bringing the buttons 34 into contact with the inwardly tapering surfaces of the insert 55 and so bringing the damping action of the springs 35 into play as the buttons traverse the surface of the insert. If the rated load is applied so that it acts upwardly in the axial direction in the tube 26, the buttons 34 will, in the rest position of the mounting, occupy a higher level than that shown in Fig. 9. By suitable dimensioning of the insert 55 it can be arranged that the wider portion 56 thereof can be brought opposite this new position of the buttons 34 by removing the insert from the pot, turning it upside down and replacing it in the pot as indicated in chain dotted lines in Fig. 9. The construction of Fig. 9 also affords damping in the radial direction after lost motion has been taken up, because radial deflection of the mounting will result in some at least of the buttons 34 being brought into contact with the inner surface of the insert 55, thereby compressing their springs 35. Preferably the insert 55 has slits extending axially into it from its upper and lower ends, so providing in it two series of upwardly and downwardly extending spring leaves.

In the mounting shown in Fig. 10, the central tube is divided into two interengaging and relatively movable sections 126, 226, which are capable of limited relative axial movement. Consequently, there is again some lost motion and the damping springs 35 will not become effective until the mounting has received a given axial displacement. In this arrangement the two sets of helical springs 29 are capable of independent resonant vibration and as the one set will start vibrating before the other set this provides a damping at the resonant frequency in addition to that afforded by the springs 35. If desired, in order to stop hammering between the two sections of the central tubes, the space 57 between them may be packed with a soft resilient material or may contain a light spring.

Finally, in the mounting shown in Figs. 11 and 12, the vibration damper is constituted by two superposed sets of spring leaves 58 fixed to the pot 20, between which is disposed a circular disc 59 having a bevelled edge. The disc 59 carries an upstanding spring plug 60, divided into individually movable elements by slits 61. The plug engages a cavity 62 in the tube 26 which is in the form of two oppositely directed conical frustra and therefore tapers upwardly and downwardly from a widest section which is level with the widest section of the plug 60 when the mounting is carrying its normal rated load. As the axial displacement of the mounting increases, the effective damping accordingly likewise increases.

If desired, additional damping may be provided by the use of springs 29 adapted to take varying loads. Thus if alternate springs 29 of the upper and lower cones are appropriate for different loads, e.g. 2 and 8 lbs., the two sets of springs comprising each cone may in appropriate cases work against one another under conditions of resonance, so tending to reduce the tendency towards resonant vibration of the mounting.

I claim:

1. An anti-vibration mounting comprising a base member including an upstanding pot having an opening in its upper end, a columnar member passing centrally through the opening in the base member, two sets of helical springs, one set on each side of the base member, said springs extending between and being secured at their opposite ends to the base member adjacent the periphery of said opening, and to the columnar member, respectively, being arranged with their axes on the surfaces of two opposed cones, and being initially tensioned and held under equal tension when the mounting is not loaded, said base member including walls within the pot providing surfaces spaced circumferentially about the end of the columnar member disposed within the pot, and means for damping components of vibration both axial of and normal to the columnar member, said damping means comprising sliding friction elements and extending from one end of said columnar member to said surfaces within said pot.

2. An anti-vibration mounting comprising a base member including an upstanding pot having an opening in its upper end, a columnar member passing centrally through the opening in the base member, two sets of helical springs, one set on each side of the base member, said springs extending between and being secured at their opposite ends to the base member, adjacent the periphery of the opening, and to the columnar member respectively, being arranged with their axes on the surfaces of two opposed cones and being initially tensioned and held under equal tension when the mounting is not loaded, said base member including walls within the pot providing surfaces spaced circumferentially about the end of the columnar member disposed within the pot, and a vibration damper comprising a plate member secured to the end of the columnar member disposed within the pot and sleeves extending radially from said plate in circumferentially spaced relationship toward said inner wall surfaces of said pot, spring means including coil springs surrounding said sleeves in frictional engagement therewith, the radially inner ends of the coil springs being disposed in fixed relationship to said plate, said coil springs urging radially outer portions of the spring means into frictional engagement with said inner wall surfaces of said base member.

3. An anti-vibration mounting comprising a base member including an upstanding pot having an opening in its upper end, a columnar member passing centrally through the opening in the base member, two sets of helical springs, one set on each side of the base member, said springs extending between and being secured at their opposite ends to the base member, adjacent the periphery of said opening, and to the columnar member respectively, being arranged with their axes on the surfaces of two opposed cones and being initially tensioned and held under equal tension when the mounting is not loaded, said base member including walls within the pot providing surfaces circumferentially about the end of the columnar member disposed within the pot, and a resilient vibration damper having a plate member secured to the end of the columnar member disposed within the pot, sleeves circumferentially spaced about the periphery of the plate and extending radially from the columnar member, individual coil springs surrounding said sleeves in frictional engagement therewith with their radially inner ends in fixed relation to the plate and buttons secured to the outer ends of said springs, said springs urging said buttons into engagement with said inner wall surfaces of the base member.

4. An anti-vibration mounting comprising a base member including an upstanding pot having an opening in its upper end, a columnar member passing centrally through the opening in the base member, two sets of helical springs, one set on each side of the base member, said springs extending between and being secured at their opposite ends to the base member, adjacent the periphery of the opening, and to the columnar member respectively, being arranged with their axes on the surfaces of two opposed cones and being initially tensioned and held under equal tension when the mounting is not loaded, said base member including walls within the pot providing surfaces spaced circumferentially about the end of the columnar member disposed within the pot, and a resilient vibration damper comprising a plate member secured to the end of the columnar member disposed within the pot, sleeves extending radially from the plate in circumferentially spaced relation toward the walls of said pot, a button having an arm slidably mounted in each of said sleeves, said buttons being adapted to frictionally engage said inner walls and spring means urging said buttons radially outward, the inner walls of said pot being divided into upper and lower portions providing two oppositely directed frustro-conical sections abutting each other such that, when the mount is in no load condition, the plane of the plate and the sleeves extending therefrom lies substantially in the plane of the line of junction of the sections and the buttons are disposed substantially adjacent to such line of junction so as to place the buttons in slightly spaced relationship to the frustro-conical wall sections.

5. A mounting in accordance with claim 4 wherein the buttons are loosely mounted.

6. A mounting in accordance with claim 2 wherein the walls within the pot slope with respect to the axis of the columnar member.

7. A mounting in accordance with claim 3 having two sets of spring leaves extending radially from the columnar member adjacent the junctions of the sets of helical springs with the columnar member, the spring leaves of each set curving toward those of the other set and terminating in overlying relation to the periphery of the opening in the pot.

8. An anti-vibration mounting comprising a base member including an upstanding pot having an opening in its upper end, a columnar member passing centrally through the opening in the base member, two sets of helical springs, one set on each side of the base member, said springs extending between and being secured at their opposite ends to the base member adjacent the periphery of said opening, and to the columnar member, respectively, being arranged with their axes on the surfaces of two opposed cones, and being initially tensioned and held under equal tension when the mounting is not loaded, said base member including walls providing surfaces spaced circumferentially about the end of the columnar member disposed within the pot, and means for damping components of vibration both axial of and normal to the columnar member, said damping means comprising sliding friction elements and extending from one end of said columnar member to said surfaces within said pot.

9. A mounting according to claim 8, wherein the vibration damper comprises an annular washer of wire mesh disposed between the columnar member and the pot.

10. A mounting according to claim 8, wherein the vibration damper comprises two sets of superposed spring leaves attached to the pot, a circular plate having its edge accommodated between the two sets of spring leaves and a spring plug carried on the plate and engaging in a cavity in the columnar member, said cavity being in the form of two oppositely directed conical frustra and the widest part of the plug being in the widest section of the cavity when the mounting is at rest under its normal rated load.

11. A mounting in accordance with claim 8 wherein the damper is slidably connected to the columnar member, and the columnar member includes shoulders limiting the motion of the damper with respect thereto.

12. A mounting in accordance with claim 8 wherein the damper includes an apertured central portion, and the columnar member includes a portion extending through the aperture of said damper and spaced stops to confine the movement of the damper along said portion of the columnar member, and the mounting includes spring means for urging the damper against one of the stops.

13. A mounting in accordance with claim 8 wherein the columnar member is divided into two inter-engaging sections which are capable of limited relative axial movement, one set of the helical springs extending to one section and the other set to the other section.

14. A mounting in accordance with claim 8 wherein the walls of the pot are recessed at spaced intervals, and the vibration damper includes a plate member connected to one end of the columnar member, and a plurality of compression springs extending therefrom to the recesses in a direction substantially transverse to the axis of the columnar member.

References Cited in the file of this patent

UNITED STATES PATENTS

| | | |
|---|---|---|
| 1,802,513 | Hull | Apr. 28, 1931 |
| 2,312,718 | Kouyoumjian | Mar. 2, 1943 |
| 2,387,066 | Harding | Oct. 16, 1945 |
| 2,425,565 | Robinson | Aug. 12, 1947 |
| 2,600,090 | Barber et al. | June 10, 1952 |
| 2,658,710 | Titus | Nov. 10, 1953 |
| 2,688,479 | Barbera | Sept. 7, 1954 |